INVENTOR
ALFRED B. GUNTHEL, JR.
BY
ATTORNEY

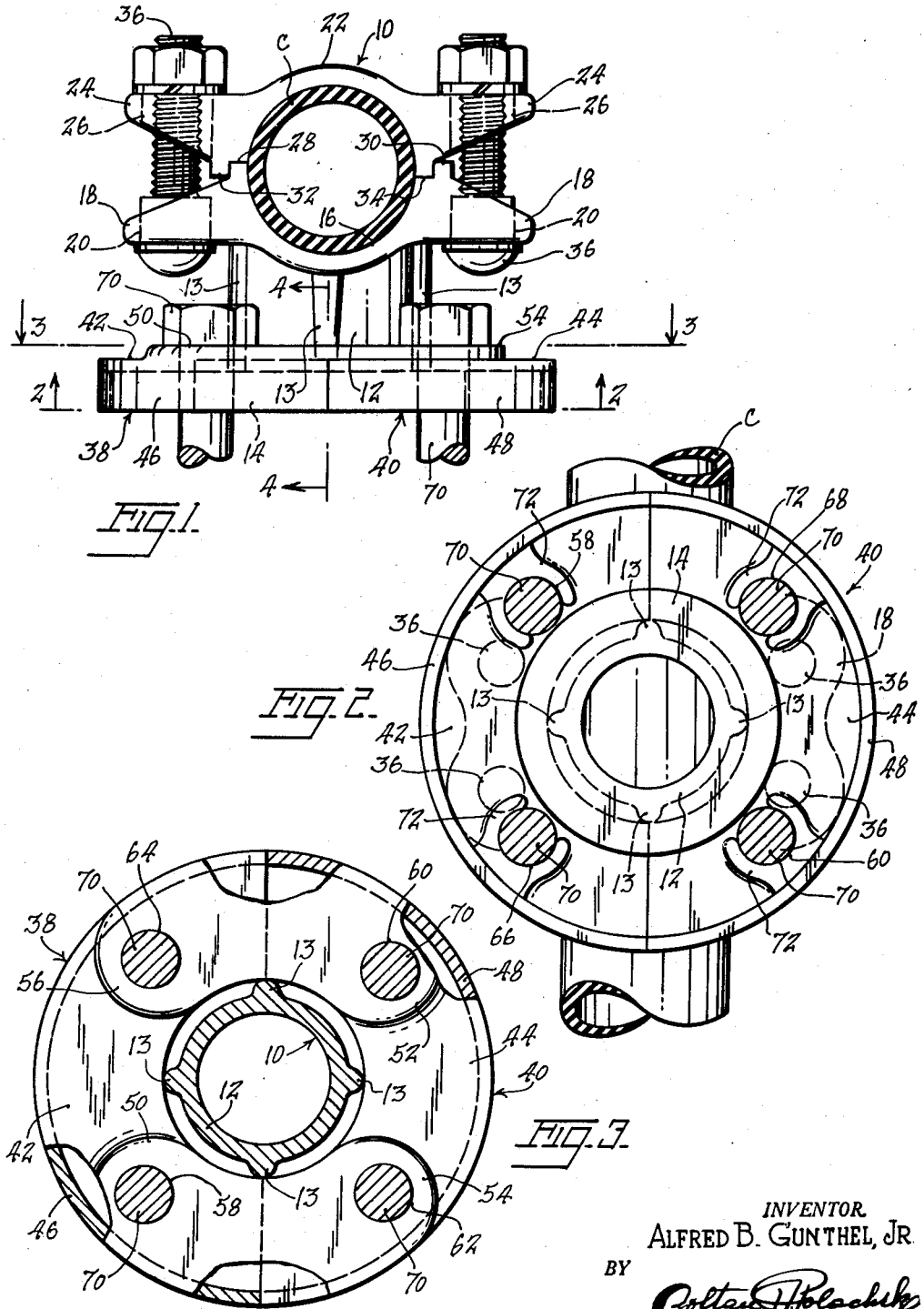
Nov. 25, 1958     A. B. GUNTHEL, JR     2,861,762
ANGULARLY ADJUSTABLE BUS BAR SUPPORT
Filed Oct. 3, 1955     2 Sheets-Sheet 1
INVENTOR
ALFRED B. GUNTHEL, JR
ATTORNEY Nov. 25, 1958 A. B. GUNTHEL, JR 2,861,762
ANGULARLY ADJUSTABLE BUS BAR SUPPORT
Filed Oct. 3, 1955 2 Sheets-Sheet 2

United States Patent Office 2,861,762
Patented Nov. 25, 1958

2,861,762

ANGULARLY ADJUSTABLE BUS BAR SUPPORT

Alfred B. Gunthel, Jr., Brooklyn, N. Y., assignor to Dossert Mfg. Corp., Brooklyn, N. Y., a corporation of New York Application October 3, 1955, Serial No. 537,974

1 Claim. (Cl. 248—70)

This invention relates to a supporting clamp for a bus bar or tubular electrical conductor, such as is used in outdoor substations or similar installations.

In installations of the type referred to, tubular conductors are generally supported upon steel frames, on which are mounted insulators which in turn provide supports or mountings for the conductor-engaging clamps. Holes are punched in the framework, to receive bolts whereby the clamp-supporting insulators may be attached.

For any of various reasons, it is sometimes necessary to make an adjustment in respect to the direction in which the conductor extends, at a location at which it is attached to, that is, clampably engaged by, one of the bus bar supports or clamps. When the holes in the framework are prepunched, angular adjustment of the bus bar support or clamp about its axis is not possible, if the clamp base and/or the holes in the framework are not specifically formed to permit such adjustment.

This problem has been recognized in the art, and efforts have been made to solve it, through the provision of clamp bodies rotatably adjustable upon a stationary base, and secured to the base in selected positions of adjustment. However, improvement in devices of this type have been found to be clearly desirable, to facilitate the angular or rotatable adjustment of the clamp body upon its base and the retention of said body in selected positions to which it is so adjusted. Since in many instances the direction in which the tubular conductor extends should be changed after the conductor has been mounted in place upon the clamp, it is obviously desirable to permit the change to be made without removal of the conductor from its clamp-engaged position, and one important object of the present invention is to provide a device which will permit this to be done.

Another object of importance is to provide a bus bar support or clamp as stated wherein the means securing said support to its associated base will firmly hold the base in each position to which the base is angularly adjusted for the purpose of changing the direction of the supported conductor.

Still another object is to provide a device which will accomplish the above stated purposes while still being capable of manufacture at relatively low cost, through the use of simply designed, inexpensive castings.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is an end elevational view of a bus bar support formed in accordance with the invention, a supported conductor being shown in transverse section.

Fig. 2 is a sectional view on line 2—2 of Fig. 1.

Fig. 5 is an enlarged, exploded perspective view of the base clamp of the support.

Figure 3:
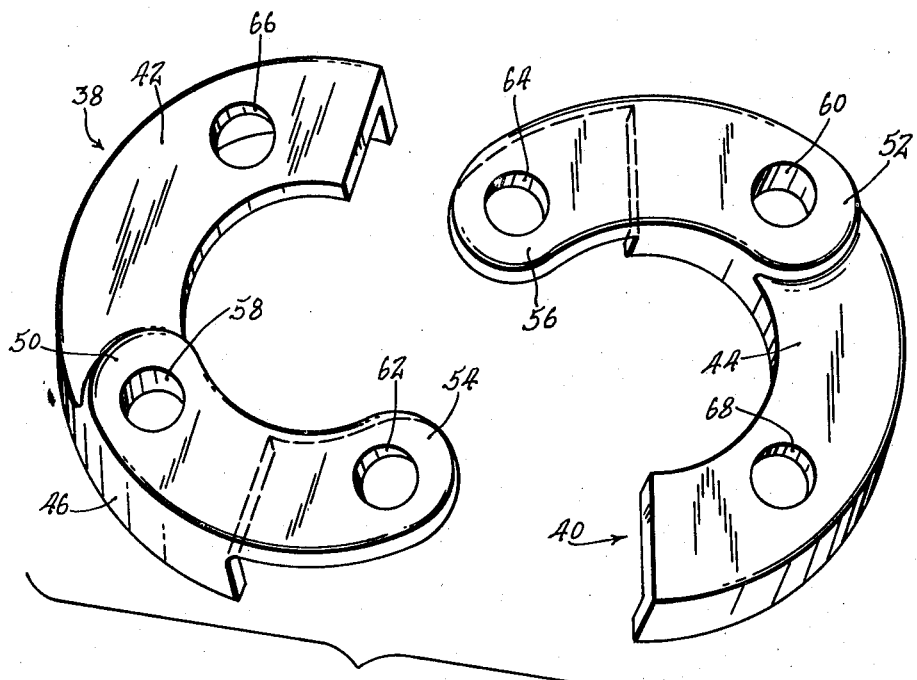
Fig. 3 is a sectional view taken substantially on line 3—3 of Fig. 1, parts being shown broken away.

A bus bar support generally designated at 10 is illustrated as including, at its lower end, a large diameter, short, tubular support post 12 formed with longitudinal, external, reinforcing ribs 13 angularly spaced 90° apart about the circumference of the post. At its lower end (see Fig. 4), the post 12 is integrally formed with a continuous, outwardly extending, circumferential flange 14.

Cast upon the upper end of the post 12 is a semi-cylindrical conductor seat member 16, integrally formed upon its opposite sides with outwardly extending ears 18.

The ears 18 are formed with elliptical or otherwise non-circular openings 20, a pair of said openings being provided in each ear with the openings of the pair being spaced longitudinally of the conductor seat member 16.

A semi-cylindrical saddle 22 is supported upon the seat member 16, and cooperates therewith in defining an open-ended, large diameter bore in which is engageable a bus bar or conductor C that is to be supported upon the bus clamp or support 10. Saddle 22 is formed at opposite sides thereof with outwardly projecting ears 24 overlying ears 18 and having elliptical openings 26 registering with the openings 20. At one side of the conductor-receiving depression of the seat member 16 there is provided spaced, upstanding lugs 28. At the other side of the seat, upstanding lugs 30 are provided, lugs 30 being spaced laterally a short distance from the depression of conductor seat 16. Downwardly extending lugs 32, 34 are similarly formed and located upon saddle 22, so as to interengage with the lugs 28, 30, thereby to hold the saddle against lateral deviation from its proper position.

After the conductor has been placed on the seat member 16, the saddle 22 is positioned thereover, and bolts 36 are extended through the registering openings of the ears, the bolts having non-circular portions adjacent their heads engageable in the openings 20, 26 as the case may be, this depending on whether the bolts are extended upwardly or downwardly. When nuts are turned home upon the bolts, after the application of suitable lock washers and gaskets, the saddle 22 will be forced downwardly so as to cause the conductor to be tightly gripped between the saddle and seat member. If desired, the conductor can be left sufficiently loose in the bore of the support to permit longitudinal sliding movement of the conductor which may be desired in some instances to permit expansion and contraction of the conductor under various weather conditions.

It may be noted at this point that the particular formation of the conductor-engaging seat member and saddle can be varied if desired, the present invention being directed mainly not to the upper part of the bus bar support that engages the conductor, but rather, to the means supporting the post 12 against an associated framework or insulator for angular adjustment about the axis of said post.

With reference to the post-engaging means, there is provided a pair of arcuate base clamps 38, 40. These are identically formed, though oppositely arranged and because of their opposite arrangement and for clarity in discussion of the interfitting and the assembly of the base clamps with one another and with the post, different reference numerals have been applied thereto.

The base clamps include flat, wide, arcuate bodies 42, 44 each curved through 180° of a circle. Cast upon the outer longitudinal edges of the bodies, and extending the full lengths of the bodies, are depending flanges 46, 48. Upon one end of the flat bodies of the base clamps, there are cast arcuate raised portions 50, 52, respectively, which are continued beyond the adjacent ends of their associated clamp bodies to form flat tongues 54, 56 disposed wholly above the planes of the top surfaces of the clamp bodies. Said top surfaces of the clamp bodies, it should be noted, are coplanar in the assembled position of the parts, and accordingly, when the clamps are engaged about the lower end of the tubular post 12 as in Fig. 4, the tongue of one base clamp will overlie the adjacent ends of the other base clamps. The underside of each tongue will, under these circumstances, be in contact with the top surface of the clamp body of the other clamp.

Formed in the raised portions of the respective clamps are openings 58, 60, and formed in the free end portions of the tongues are openings 62, 64 respectively. Adjacent the other end of the respective clamp bodies there are formed openings 66, 68 respectively.

Figure 4:
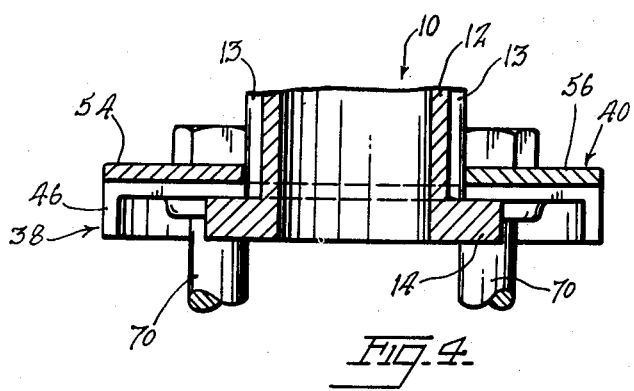
Fig. 4 is a sectional view on line 4—4 of Fig. 1.

When the clamps are assembled with the posts, the inside longitudinal edge portions of the clamp bodies will overlie and bear downwardly against the circumferential flange 14 of the post 12, as shown in Fig. 4. In this position of the base clamps, the opposite ends of the clamps will be in abutting relation, and further, openings 62 and 68 will be in registration while openings 64 and 66 will also be in registration. Bolts 70 are extended through the openings 62, 68 and 64, 66, and also through the openings 58, 60. These bolts are extended downwardly for positioning in the provided openings of a supporting framework or insulator, not shown. When the bolts are securely connected to the supporting structure, the arcuate base clamps will be drawn downwardly so as to bear tightly against flange 14, thus to anchor the supporting post 12 to the associated support structure in any position to which said support post (and hence the conductor C) may have previously been angularly adjusted about the axis of the post.

Preferably, to strengthen the base clamps, on the underside thereof there are formed bosses 72 extending about the several openings of the base clamps.

By reason of the construction illustrated, it will be seen that should it be desired to change the direction of the conductor C after the same has been mounted, it is not necessary to loosen and remove the saddle 22 and conductor C. Instead, the bolts 70 are loosened slightly, to permit the post 12 to be rotatably adjusted to a selected extent, after which the bolts 70 are tightened once again.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A bus bar support comprising a post, means thereon to receive a bus bar or the like, a flange on one end of the post, and interfitting, arcuate base clamps formed separately from and overlying said flange, said clamps having means to attach the same to one another and to an associated support structure, each clamp including a body extending through 180° of a circle, the bodies of the respective clamps being disposed in end-abutting relation, said bodies being of flat, wide, configuration and being disposed in a common plane, the bodies respectively including depending flanges formed upon the outer longitudinal edges thereof, said clamps further including a tongue on each body projecting beyond one end of the body to overlie the adjacent end of the other body, said bodies and the tongues having registering openings adapted to receive fastening elements and defining the means to attach the clamps to one another and to the support structure, the respective bodies having raised portions at said one end thereof merging into the tongues, the raised portions being formed with openings for receiving fastening elements extending through the support structure, the bodies further having openings adjacent the ends thereof remote from the tongues for receiving fastening elements, said base clamps having bosses on the under surface thereof around the openings therein for strengthening the base clamps.

References Cited in the file of this patent
UNITED STATES PATENTS

| | | |
|---|---|---|
| 1,730,606 | Flath | Oct. 8, 1929 |
| 2,197,728 | Lee | Apr. 16, 1940 |
| 2,681,817 | Demlow | June 22, 1954 |
| 2,683,613 | Streed et al. | July 13, 1954 |